United States Patent
Vajo et al.

(10) Patent No.: US 9,540,738 B2
(45) Date of Patent: Jan. 10, 2017

(54) ELECTROCHEMICAL PROCESS AND DEVICE FOR HYDROGEN GENERATION AND STORAGE

(71) Applicant: GM GLOBAL TECHNOLOGY OPERATIONS LLC, Detroit, MI (US)

(72) Inventors: John J. Vajo, West Hills, CA (US); Wen Li, El Segundo, CA (US); Ping Liu, Irvine, CA (US); Frederick E. Pinkerton, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 14/287,475

(22) Filed: May 27, 2014

(65) Prior Publication Data

US 2014/0262813 A1  Sep. 18, 2014

Related U.S. Application Data

(63) Continuation of application No. 13/293,432, filed on Nov. 10, 2011, now Pat. No. 8,764,966.

(51) Int. Cl.
| | |
|---|---|
| *C25B 1/02* | (2006.01) |
| *C25D 11/04* | (2006.01) |
| *H01M 8/04* | (2016.01) |
| *H01M 8/06* | (2016.01) |

(52) U.S. Cl.
CPC ............... *C25B 1/02* (2013.01); *C25D 11/04* (2013.01); *H01M 8/04216* (2013.01); *H01M 8/0656* (2013.01)

(58) Field of Classification Search
CPC .............................................. C25B 1/02–1/12
See application file for complete search history.

(56) References Cited

U.S. PATENT DOCUMENTS

| | | |
|---|---|---|
| 3,192,138 A | 6/1965 | Enk et al. |
| 4,146,446 A | 3/1979 | von Sturm |
| 4,788,491 A | 11/1988 | Ayers |
| 4,986,887 A | 1/1991 | Gupta et al. |
| 6,991,719 B2 | 1/2006 | Ovshinsky et al. |
| 7,776,201 B1 | 8/2010 | Vajo et al. |
| 7,790,013 B2 | 9/2010 | McClaine et al. |
| 2002/0197530 A1 | 12/2002 | Tani et al. |
| 2005/0016866 A1 | 1/2005 | Kramer et al. |
| 2008/0286652 A1 | 11/2008 | Nazri et al. |
| 2009/0038954 A1* | 2/2009 | Zidan ............ C25B 1/00 205/477 |
| 2009/0127129 A1 | 5/2009 | Nazri et al. |

FOREIGN PATENT DOCUMENTS

| | | |
|---|---|---|
| CN | 1417878 A | 5/2003 |
| CN | 101124154 A | 2/2008 |
| EP | 0976168 B1 | 3/2004 |
| JP | 05307973 A | 11/1993 |
| WO | 9926802 A1 | 6/1999 |

* cited by examiner

*Primary Examiner* — Nicholas A Smith
*Assistant Examiner* — Brian W Cohen
(74) *Attorney, Agent, or Firm* — Reising Ethington P.C.

(57) ABSTRACT

Both the reaction of hydride-forming compositions with hydrogen to form hydrides, and the decomposition of such hydrides to release hydrogen may be promoted electrochemically. These reactions may be conducted reversibly, and if performed in a suitable cell, the cell will serve as a hydrogen storage and release device.

14 Claims, 2 Drawing Sheets

ELECTROCHEMICAL PROCESS AND DEVICE FOR HYDROGEN GENERATION AND STORAGE

This application is a division of co-pending application Ser. No. 13/293,432, filed Nov. 10, 2011 and titled, Electrochemical Process and Device for Hydrogen Generation and Storage.

TECHNICAL FIELD

This invention pertains to processes and devices for storing and generating hydrogen using reversible electrochemical reactions to both promote decomposition of hydrides for release of hydrogen and formation of hydrides for storage of hydrogen.

BACKGROUND OF THE INVENTION

There are many devices which consume hydrogen and produce power. For example, proton exchange membrane fuel cells are being developed currently as power sources for a variety of military, transportation, and electronic device applications. Such fuel cells require that hydrogen, sufficient to generate the required power output, be available when required. Meeting this requirement calls for a high density and energy efficient hydrogen storage technology.

Many such technologies have been proposed and studied including devices that store hydrogen: as compressed hydrogen gas; as cryogenic liquid hydrogen; as hydrogen molecules adsorbed on high surface area supports; as hydrogen atoms at low density in metallically bonded solid transition metal hydrides; as hydrogen atoms at high density in ionically bonded solid light metal hydrides; and as hydrogen atoms at high density in polar covalently bonded solid complex hydrides. Each of these approaches has limitations.

Those approaches which rely on chemical bonding to store and release hydrogen are attractive, but input of energy, conventionally as heat, is required for hydrogen release. In transition metal hydrides, hydrogen may be released at moderate temperatures because the hydrogen and transition metal are relatively weakly bonded with metallic bonds. But transition metal atoms have atomic weights of greater than approximately 50 atomic mass units and store, at most, approximately two hydrogen atoms per transition metal atom. Thus, the gravimetric storage density of transition metal hydrides is less than 4 weight percent hydrogen, which is too low for many applications.

Light metal atom hydrides can have high hydrogen densities, up to approximately 12 weight percent hydrogen. However, the ionic chemical bonds between the metal and the hydrogen in these hydrides are very strong and, therefore, high temperatures, beginning at about 280° C. and ranging up to 900° C. and greater are needed to release the hydrogen. These temperatures are impractical for many applications.

Hydrogen stored in polar covalently bonded light metal complex hydrides can have storage densities up to 18 weight percent hydrogen. Like light metal hydrides, these compounds are generally very strongly bound and therefore, again, high temperatures are required to release the hydrogen.

There is therefore need for improved methods of chemically storing and releasing hydrogen.

SUMMARY OF THE INVENTION

This invention provides a device for generating hydrogen gas ($H_2$) from metal cation-based hydrogen storage compounds. In some embodiments, after discharge of hydrogen, the device may be regenerated when exposed to hydrogen gas. The device consists of an electrochemical cell, which comprises a negative electrode and a positive electrode. Either or both of these electrodes may contain solid metal cation-based hydrogen storage compounds in the active electrode material. The electrochemical cell also contains an electrolyte that ionically conducts the metal cation in the metal cation-based hydrogen storage compound. The device also contains external connections for the negative and positive electrodes. These connections enable use of an electrical power source and circuit to establish an electrochemical potential between the negative and positive electrodes and enable flow of electrical current between them.

In practices of this invention an imposed electrical potential is used to decompose solid metal cation-based hydrogen storage compounds in the electrode material into hydrogen gas. When, for example, the negative electrode contains a solid metal cation-based hydrogen storage compound, the flow of electrons away from the negative electrode causes the electrochemical decomposition of the metal cation-based hydrogen storage compound into hydrogen gas and metal cations. The hydrogen flows out of the electrode and exits the device. It may be delivered, for example, to nearby hydrogen using fuel cell or other hydrogen-consuming device. The metal cations flow ionically through the electrolyte to the positive electrode where they are electrochemically reduced by the electrons flowing into the positive electrode from the circuit. When the positive electrode contains a solid metal cation-based hydrogen storage compound, hydrogen is produced at the positive electrode in an analogous manner. In some embodiments hydrogen may be evolved at both the positive and negative electrodes.

Examples of suitable solid metal cation-based hydrogen storage compounds for negative electrode active materials include $LiH$, $LiBH_4$ or $LiAlH_4$. Examples of suitable solid metal cation-based hydrogen storage compounds for positive electrode active materials include $LiOH$ and $LiNH_2$. In many embodiments of the invention the electrode materials are prepared as fine particles and pressed or bonded to a suitable metallic current collector for the respective electrode. Fine particles of electrically conductive material may also be mixed with the active metal cation-based hydrogen storage compound to provide for better conduction of electrons to or from the active material in each electrode assembly. The liquid electrolyte may comprise any solvent and solute combination that is chemically compatible with the negative and positive electrode materials and that ionically conducts the metal cation in the metal cation-based hydrogen storage compound(s).

Thus, this invention uses an electrochemical potential to decompose solid metal cation-based hydrogen storage compounds into hydrogen gas. The use of the electrochemical potential is effective in generating hydrogen over a wide range of temperatures that may exist in the region of many hydrogen-consuming devices. Despite fluctuations in such ambient temperatures it is often unnecessary to heat (or cool) the hydrogen generator. When desired, it may be preferred to size the electrochemical cell or groups of cells to deliver a specified volume of hydrogen for delivery to a hydrogen-consuming device. And in many embodiments, it may be possible to re-form a metal cation-based hydrogen storage compound without removing the material from the cell by supplying hydrogen to the electrode and reversing current flow.

A wide range of reactants and reactions may be employed, each with its individual capability for storing hydrogen.

Preferred hydrides include low atomic weight, light metal simple hydrides, for example LiH or MgH$_2$ or complex hydrides such as alanates (AlH$_4^-$), amides (NH$_2^-$) or borohydrides (BH$_4^-$). Such complex hydrides may include light metal cations such as Li$^+$, Mg$^+$, Na$^+$, K$^+$ and Ca$^{++}$. Other cations in such complex metal hydrides may undergo similar reactions, but because one figure of merit of chemical hydrogen storage approaches is the gravimetric efficiency, that is the mass of stored hydrogen per unit mass of compound, heavier cations which reduce the gravimetric efficiency are rarely employed. All preferred compositions will be solid at temperatures of below about 100° C. or so. Exemplary compositions and reactions, with stored hydrogen percentage by weight indicated in parentheses, include:

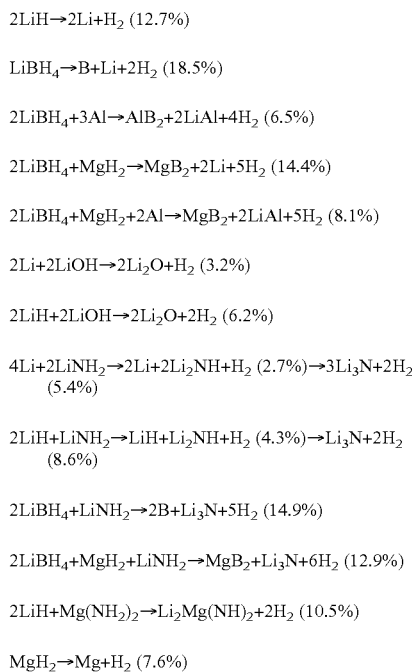

$$2LiH \rightarrow 2Li + H_2 \ (12.7\%) \qquad 1.$$

$$LiBH_4 \rightarrow B + Li + 2H_2 \ (18.5\%) \qquad 2.$$

$$2LiBH_4 + 3Al \rightarrow AlB_2 + 2LiAl + 4H_2 \ (6.5\%) \qquad 3.$$

$$2LiBH_4 + MgH_2 \rightarrow MgB_2 + 2Li + 5H_2 \ (14.4\%) \qquad 4.$$

$$2LiBH_4 + MgH_2 + 2Al \rightarrow MgB_2 + 2LiAl + 5H_2 \ (8.1\%) \qquad 5.$$

$$2Li + 2LiOH \rightarrow 2Li_2O + H_2 \ (3.2\%) \qquad 7.$$

$$2LiH + 2LiOH \rightarrow 2Li_2O + 2H_2 \ (6.2\%) \qquad 8.$$

$$4Li + 2LiNH_2 \rightarrow 2Li + 2Li_2NH + H_2 \ (2.7\%) \rightarrow 3Li_3N + 2H_2 \ (5.4\%) \qquad 9.$$

$$2LiH + LiNH_2 \rightarrow LiH + Li_2NH + H_2 \ (4.3\%) \rightarrow Li_3N + 2H_2 \ (8.6\%) \qquad 10.$$

$$2LiBH_4 + LiNH_2 \rightarrow 2B + Li_3N + 5H_2 \ (14.9\%) \qquad 11$$

$$2LiBH_4 + MgH_2 + LiNH_2 \rightarrow MgB_2 + Li_3N + 6H_2 \ (12.9\%) \qquad 12.$$

$$2LiH + Mg(NH_2)_2 \rightarrow Li_2Mg(NH)_2 + 2H_2 \ (10.5\%) \qquad 13.$$

$$MgH_2 \rightarrow Mg + H_2 \ (7.6\%) \qquad 14.$$

These reactions, and others not listed, may be promoted within an electrochemical cell, which contains a negative electrode and a positive electrode immersed in an electrolyte. Either or both of these electrodes may be porous and contain solid metal cation-based hydrogen storage compounds supported on a conductive sheet, mesh or frame fabricated of, for example, Ni, Cu and Al. The electrodes may also contain metallic hydride-forming metals and alloys in partially or fully dehydrogenated and electrically conducting form to convey electrons and facilitate the transport of hydrogen. These hydride-forming metals and alloys may include Mg, Mg$_2$Ni, TiFe, ZrNi, ZrMn$_2$, LaNi$_5$, and LaNi$_{5-x}$Sn$_x$. For heightened gravimetric efficiency, only minimal quantities of the electrically conductive powder, sufficient to ensure at least a current path to the hydrogen storage compound may be employed. Some additives, such as LaNi$_5$, may exhibit some catalytic properties and may therefore be effective even when present in small quantities. Carbon nanotubes or graphene may be employed where good electrical conductivity at low weight fractions is paramount.

A binder material, for example styrene-butadiene rubber or polyvinyldiene fluoride, may be added, but only to the extent required to ensure the integrity and long-term performance of the electrode. Depending on the choice of electrically-conducting hydride-forming metals and alloys, it may be preferred to incorporate catalytic promoters (for hydrogen) such as carbon-supported Pd, Pt, or Ni, singly, or in combination as mixtures and alloys.

For reactions involving only a single chemical species, for example reactions 1., 2., and 14., only a single prepared electrode is required and the second electrode may be any (electrically) conductive material which does not react with the electrolyte, for example, lithium, copper, nickel or platinum among many others. For reactions involving more than one reactive species, for example reactions 3. and 4., another of the reactive species must be incorporated into the second electrode. Generally this will entail fabricating a powder processed electrode as already described, but a solid conductive electrode may also be appropriate, as in reaction 3. where a solid aluminum metal-based electrode may be used.

For reactions involving lithium ion conduction, non-aqueous solutions of lithium salts such as 1 molar LiPF$_6$ dissolved in a 1:1 mixture of ethylene carbonate and dimethyl carbonate or 1 molar LiClO$_4$ in dimethyl carbonate may be used as electrolytes.

The cell also includes external connections, attached to the negative and positive electrodes. These connections enable connection of a power source and circuit external to the cell to impose an electrical potential difference between the negative and positive electrodes and enable flow of electrical current between the positive and negative electrodes.

During operation to generate hydrogen, the electrical potential difference imposed by an external power source causes electrons to flow away from the negative electrode and into the positive electrode through the external circuit.

The device may be reversible so that it may also function to store hydrogen in metal cation-based hydrogen storage compounds. In this case, the electrodes contain initially metal cation-based hydrogen storage compounds in a dehydrogenated state; the direction of current flow in the circuit is reversed, promoting flow of electrons from the positive electrode to the negative electrode; and hydrogen gas (H$_2$) is supplied to either or both of the negative or positive electrodes.

It is preferred that the electrodes be closely spaced, with a spacing ranging from about 20 micrometers to about 30 micrometers to minimize inter-electrode resistance. The electrodes may be planar, co-extensive and arranged in opposition. Folded configurations in which one electrode adopts a 'Z' or 'W' shape with interleaved co-extensive opposing electrodes in face to face opposition may also be employed as may spiral-wound electrode arrangements.

In some cell geometries, hydrogen transport over appreciable distances may be required to convey hydrogen from its source within the cell to the cell exterior. Similarly charging hydrogen to the cell interior may involve extensive hydrogen transport. To minimize the extent of transport by diffusion, it may be preferred to incorporate channels or passages in the cell extending from the outer electrode and in communication with the cell exterior. Such channels may enable prompt discharge of hydrogen gas from the electrochemical cell interior during hydrogen generation and prompt loading of the cell interior with hydrogen during hydrogen storage.

It may be preferred to operate the cell under modest pressure, relative to atmospheric pressure. Suitably the hydrogen pressure should be at least about 5 bar or so for compatibility with fuel cell systems which are commonly operated at elevated pressure.

The pressure of the hydrogen released by the reaction is directly related to the applied potential. Commonly the cited potential required to drive the reaction and evolve hydrogen is an equilibrium potential based on a hydrogen pressure of one atmosphere. A greater (than equilibrium) potential will result in a higher pressure of the evolved hydrogen. Hence, under stable conditions, a suitable hydrogen pressure may be 'dialed in' by appropriately setting the applied potential.

But, because stability of operation may not be assured, it may be preferred to operate the cell at a potential which, over the expected range of any variables will guarantee at least a minimum hydrogen pressure, for example the 5 bar or so appropriate for fuel cells. A pressure regulator, installed in the hydrogen line between the cell and any hydrogen-consuming device, may be used to ensure that the hydrogen-consuming device is isolated from the higher gas pressure.

Alternately, if a hydrogen pressure sensor is used and, optionally, a (hydrogen) flow sensor, the hydrogen pressure and hydrogen demand may be used to control the applied cell potential using either on-off or proportional control These and other aspects of the invention are described below, while still others will be readily apparent to those skilled in the art based on the descriptions provided in this specification.

DESCRIPTION OF PREFERRED EMBODIMENTS

Figure 1:
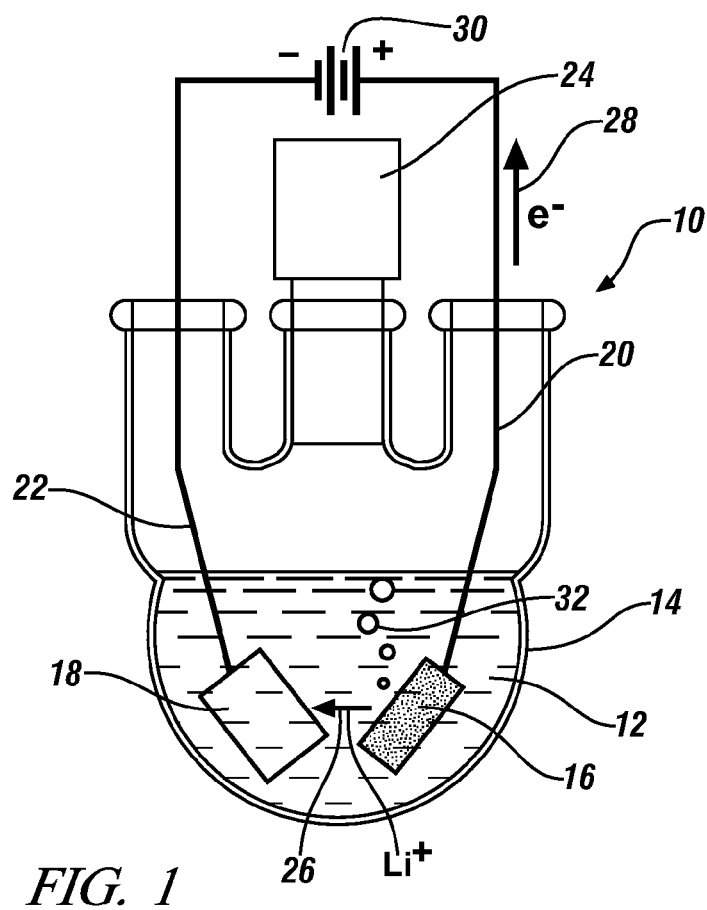
FIG. 1 is a schematic representation of a cell for electrochemical production of hydrogen with facing opposed planar electrodes and incorporating hydrogen sensor.

The following description of the embodiment(s) is merely exemplary in nature and is not intended to limit the invention, its application, or uses.

In vehicle applications, chemical storage and release of hydrogen using metal hydrides appears to be an attractive alternative to physical storage of hydrogen which may require one or more of, high pressures, or low temperatures or specially prepared substrates to be viable.

For example, most hydrides, in the absence of a stimulus, are stable at ambient and near-ambient temperatures of say 10-100° C. so that they may be stored without need for low temperature or high pressure. The volume of hydrogen produced may be changed incrementally by addition of more or less reagent to modify the available vehicle range or to satisfy the needs of vehicles of different sizes and use patterns. Chemical reactions for release of hydrogen may be reversed to regenerate and recharge a spent hydrogen source, either on-vehicle or with suitable packaging and connection capability, off-vehicle, in conjunction with a storage unit exchange scheme. The extent of chemical reaction may be controlled to enable a hydrogen flow suitable for the desired vehicle performance, for example its 0-60 mph acceleration time.

But chemical approaches are also challenged. The more readily decomposed and reconstituted hydrogen storage compounds have only low gravimetric efficiencies while higher gravimetric efficiency hydrogen storage compounds are more stable and efficiently release and store hydrogen only at unacceptably high temperatures. These issues generally lessen the gravimetric and volumetric efficiency of chemical storage. The lessened efficiency may be evidenced directly through a need for a large mass of low efficiency hydrides, or indirectly, through a need for additional thermal handling equipment such as insulation, heaters or heat exchangers.

Although heat is the most common form of energy input used to promote chemical reactions, it is known that there is an equivalence between the thermodynamics of a chemical reaction and the electrical potential which must be applied to promote the same reaction electrochemically. Hence decomposition of hydrogen-containing compounds may feasibly be promoted electrochemically provided the reactant(s), most of which are electrically non-conductive, may be incorporated into an electrically conductive electrode and an electrolyte suitable for ionic conduction may be identified. If these requirements are satisfied it may be feasible to reversibly release and store hydrogen by application of an electrical potential to two electrodes immersed in a suitable electrolyte. Advantageously, such electrochemical reactions may be conducted at temperatures of less than 100° C. and possibly even as low as about 25° C.

Among many others, some potential reactions which may be considered for such electrochemically-promoted hydrogen release include:

| | |
|---|---|
| $2LiH \rightarrow 2Li+H_2$ (12.7%) | 1. |
| $LiBH_4 \rightarrow B+Li+2H_2$ (18.5%) | 2. |
| $2LiBH_4+3Al \rightarrow AlB_2+2LiAl+4H_2$ (6.5%) | 3. |
| $2LiBH_4+MgH_2 \rightarrow MgB_2+2Li+5H_2$ (14.4%) | 4. |
| $2LiBH_4+MgH_2+2Al \rightarrow MgB_2+2LiAl+5H_2$ (8.1%) | 5. |
| $2Li+2LiOH \rightarrow 2Li_2O+H_2$ (3.2%) | 7. |
| $2LiH+2LiOH \rightarrow 2Li_2O+2H_2$ (6.2%) | 8. |
| $4Li+2LiNH_2 \rightarrow 2Li+2Li_2NH+H_2$ (2.7%) $\rightarrow 3Li_3N+2H_2$ (5.4%) | 9. |
| $2LiH+LiNH_2 \rightarrow LiH+Li_2NH+H_2$ (4.3%) $\rightarrow Li_3N+2H_2$ (8.6%) | 10. |
| $2LiBH_4+LiNH_2 \rightarrow 2B+Li_3N+5H_2$ (14.9%) | 11 |
| $2LiBH_4+MgH_2+LiNH_2 \rightarrow MgB_2+Li_3N+6H_2$ (12.9%) | 12. |
| $2LiH+Mg(NH_2)_2 \rightarrow Li_2Mg(NH)_2+2H_2$ (10.5%) | 13. |
| $MgH_2 \rightarrow Mg+H_2$ (7.6%) | 14. | where the percentages in parentheses are the percentage by weight of hydrogen which may be released or stored. The cations in complex hydrides may include, in addition to $Li^+$ and $Mg^{++}$ as shown, other light metal cations such as $Na^+$, $K^+$ and $Ca^{++}$. Complex metal hydrides of other cations may exist and may undergo similar reactions, but because their higher mass decreases the gravimetric efficiency of the compound, hydrides of such cations are not commonly considered for hydrogen storage. All preferred compositions will be solid at temperatures of below about 100° C. or so.

The compounds listed include compounds in which the hydrogen is in hydridic form, for example LiH, LiBH$_4$ or LiAlH$_4$ and compounds in which the hydrogen is in protonic form, including LiOH and LiNH$_2$.

Hydridic compounds contain hydrogen which is at least partially negatively charged with between <0 and −1 elementary units of charge. In such hydridic compounds, when employed as the negative electrode of an electrochemical cell, the flow of electrons away from the negative electrode during operation causes the electrochemical decomposition of the metal cation-based hydrogen storage compound into hydrogen gas and metal cations. The hydrogen gas is liberated at the negative electrode and exits the device. The metal cations are released into the electrolyte and flow ionically through the electrolyte to the positive electrode. At the positive electrode, these metal cations are electrochemically reduced by the electrons flowing into the positive electrode from the circuit.

In protonic compounds, the hydrogen is at least partially positively charged with between >0 and +1 elementary units of charge. In an electrochemical cell, the negative electrode may contain the reduced (metallic) form of the metal cation while the metal cation-based hydrogen storage compound may be the positive electrode. During operation, the flow of electrons away from the negative electrode causes release of the metal in the form of metal cations into the electrolyte (electrochemical oxidation of the metal). The metal cations flow ionically through the electrolyte to the positive electrode where they react electrochemically with the metal cation-based hydrogen storage compound and the electrons flowing into the positive electrode from the circuit. Reaction of the metal cation-based hydrogen storage compound with the metal cations and electrons causes decomposition of the metal cation-based hydrogen storage compound into hydrogen gas and a (fully or partially) dehydrogenated metal cation compound. The hydrogen gas is liberated at the positive electrode.

So, by appropriate choice of compounds and placement of the compounds at the negative or positive electrode of an electrochemical cell, hydrogen may be evolved at the negative electrode in an embodiment, at the positive electrode in another embodiment and at both the negative and the positive electrodes simultaneously in a yet further embodiment. Reversing the polarity of the impressed voltage and supplying hydrogen to the cell has the potential to reconstitute the original hydrogen storage compositions.

Because many of the suitable compounds are electrically non-conducting, the electrodes must be fabricated with electrically-conductive constituents and features to assure that any imposed electrical potential is effectively applied to the hydride. Generally such electrodes are porous and comprise intimate powder mixtures of hydrogen storage compounds with an electrically conductive medium such as metal or metal alloy, for example Ni, Cu, or Al or their alloys in the form of powder or as a foam. Powdered graphite, carbon, carbon nanotubes and graphene may also be suitable.

The electrodes may also contain metallic, electrically conducting hydride-forming alloys in partially or fully dehydrogenated form to convey electrons and facilitate the transport of hydrogen. Exemplary hydride-forming alloys may include Mg, Mg$_2$Ni, TiFe, ZrNi, ZrMn$_2$, LaNi$_5$, and LaNi$_{5-x}$Sn$_x$. Generally the electrically conductive powder is present only in quantities suitable to ensure a current path to the hydrogen storage compound. Minimal addition of a binder, for example styrene-butadiene rubber or polyvinylidene fluoride, may be made to ensure the integrity of the electrode. Catalytic promoters (for hydrogen), such as carbon-supported Pd, Pt, or Ni, individually or as mixtures or alloys, may also be incorporated into the electrodes.

The electrodes may be fabricated by mechanically milling a mixture of electrically conducting and hydride powders to comingle the powders and achieve a desired particle size, typically ranging from 1 micrometer to 100 micrometers. It may be preferred to size the resulting powders, suitably ranging from 5 micrometers to 10 micrometers, to assure that, when compacted into an electrode, pores of suitable size and density for transport of hydrogen are formed. Such pores are intended to facilitate and enhance transport of hydrogen between the electrode interior and the electrode exterior.

For enhanced electrode cohesion, the particles may be suspended in an extremely dilute (1% to 3%) solution of a binder such as styrene-butadiene rubber or polyvinylidene fluoride (PVDF) dissolved in a suitable solvent. For many hydrides acetone is a suitable solvent, but acetone is known to react with at least NaAlH$_4$ leading to hydrogen release. To avoid reaction with this and other, similarly-reacting hydrides, alternative solvents such as tetrahydrofuran (THF) or diethyl ether may be used. After compaction and evaporation of the solvent the binder will be effective in further securing the particles to one another.

The electrode may be supported by, and connected to, an external circuit through a conductive support such as a hollow frame, wire mesh or thin foil. The electrode may have the support incorporated within the electrode by embedding the electrode into the electrode powder so that, upon compaction, the electrode and the support may be mechanically interlocked. Such an approach is most effective if the support has open features to entrain powder and so is best suited to open frame or wire mesh supports and the like. Alternatively, if the solvent dissolved binder approach is used, a powder/binder/solvent slurry or paste may be applied to the support by spraying painting or by use of a doctor blade or other similar approach. This may be the preferred approach for more featureless supports such as a thin foil but is applicable to all support geometries. The approaches may also be combined by compacting a 'near-dry' powder/binder/solvent mixture around a support and evaporating the remaining solvent so that both the binder and the mechanical interlock combine to secure the electrode to its support. Suitable materials for the supports include a metal mesh or a foam, fabricated from, for example Ni, Cu, or Al. Carbon foam may also be suitable.

The electrolyte may be any solvent and solute combination that is chemically compatible with the negative and positive electrodes and that ionically conducts the metal cation in the metal cation-based hydrogen storage compound. A typical non-aqueous electrolyte that is useful for Li$^+$ cations is 1 molar LiPF$_6$ dissolved in 1:1 ethylene carbonate/dimethyl carbonate. For Mg$^{++}$ ions also, a 1:1 mixture of ethylene carbonate/dimethyl carbonate may serve as a solvent for a suitable magnesium salt.

A suitable device for practice of the invention is shown, schematically, in FIG. 1. The operating features of the device, as illustrated, are those which result when the reactant and reaction are those of reaction 1., that is:

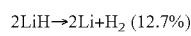

It is worth noting that, if thermally driven, a temperature of ~940° C. would be required to produce hydrogen at a pressure of about 1 bar due to the high positive Gibbs free energy of the reaction (ΔG=137 kJ/mol-H$_2$), large entropy change (ΔS=148 J/K-mol-H$_2$), and high enthalpy of reaction ($\Delta H=181$ kJ/mol-$H_2$) but that an electrochemically driven reaction may be achieved by application of only 0.71 volts.

In this reaction, the metal cation-based hydrogen storage compound containing hydrogen in hydridic form in the negative electrode is LiH, the metal cation is $Li^+$, and hydrogen is released from the negative electrode. The overall reaction results from two half cell reactions,

   1a. at the negative electrode, and

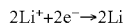   1b at the positive electrode

Referring to FIG. 1, an electrochemical cell 10 comprises an electrolyte 12, and electrodes 16,18 contained within a container 14, where the electrodes are connected to an external circuit through leadwires 20, 22. Cell 10 may further include a hydrogen sensor 24. The circuit may be completed by attaching electrode leadwires 20, 22 to power source 30. It will be appreciated that this representation is schematic only and that each of the cell elements, including, but not limited to, container 14, electrodes 16,18 and electrolyte 12 may, in a particular implementation, adopt different shapes and configurations.

Electrode 16 may comprise LiH and electrode 18 may comprise lithium metal. Upon connection of the electrode leadwires 20,22 of cell 10 to power source 30, half cell reaction 1a, will occur at electrode 16 causing an electronic current to flow in direction of arrow 28, an ionic current of $Li^+$ ions to migrate through electrolyte 12 to electrode 18 in the direction of arrow 26, and evolution of hydrogen gas 32. Lithium ions, on reaching electrode 18, may then be reduced to lithium metal as shown at reaction 1b. Electrode 18 since it does not chemically participate in the reduction of lithium ions to metal may be fabricated of any convenient electrical conductor which does not react with the electrolyte or alloy with lithium metal.

Further understanding of the invention may result from consideration of the following example, which similarly involves the evolution of $H_2$ by electrochemical processing of LiH by the overall process of reaction 1. and the half cell reactions of reactions 1a. and 1b.:

A negative electrode was fabricated by mechanically milling a mixture of 10 wt % (0.12 grams) LiH with 90 wt % (1.08 grams) $LaNi_5$ in a Fritsch P6 planetary mill for 1 hour at 400 rpm. Such a procedure may be expected to result in particle agglomerates ranging from 1 to 10 micrometers in size, each agglomerate comprising smaller individual crystallites. The $LaNi_5$ was used to provide electrical conductivity, mechanical stability, and to facilitate hydrogen transport. The milled mixture was formed into a disk electrode approximately 10 millimeters in diameter by pressing it onto a Ni grid using a screw press and applying a torque of about 300 inch-lbs for about 10 seconds. A typical electrode, including its support mesh, weighed about 0.1 grams. The negative electrode was used in a laboratory electrochemical cell such as is shown in FIG. 1 with a Li foil positive electrode and an electrolyte consisting of 1 molar $LiPF_6$ dissolved in a 1:1 mixture of ethylene carbonate and dimethyl carbonate maintained under an argon atmosphere. External connections (not shown in FIG. 1) in this laboratory cell were made with alligator clips. An electrical potential of 3 volts, was applied by a Solartron 1287 potentiostat. This corresponds to an overpotential relative to the equilibrium potential of 0.71 volts and was selected to drive the reaction. Release of hydrogen occurred according to Reaction 1. listed above and was monitored using a Model 700 hydrogen sensor from $H_2$Scan.

Figure 2:
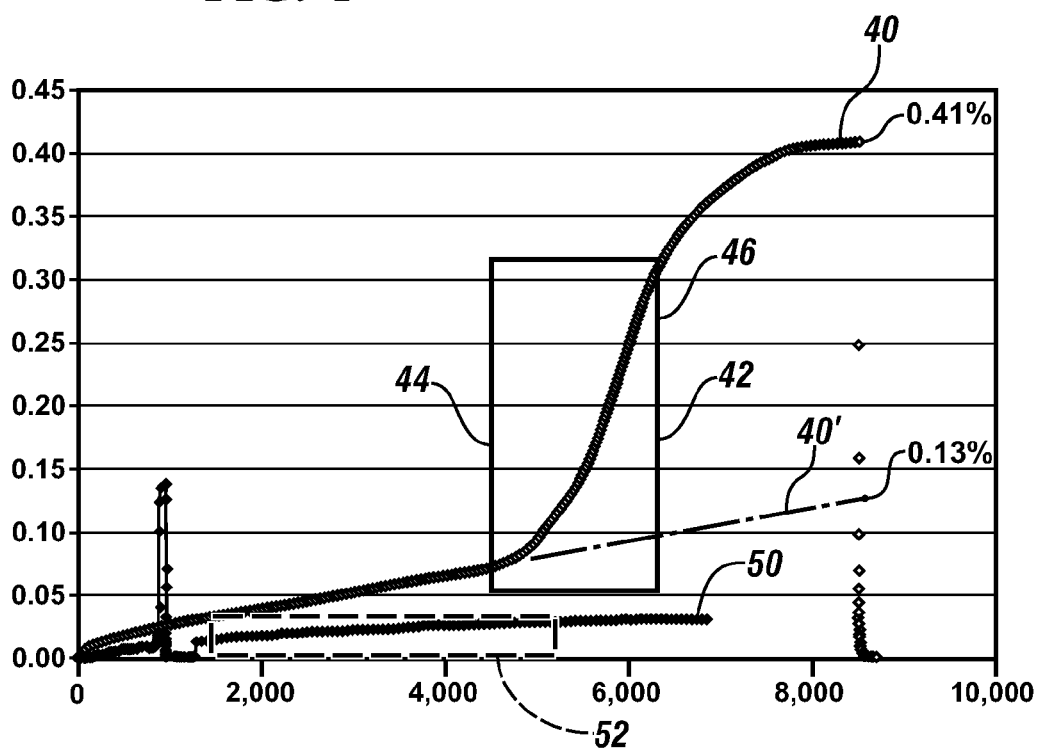
FIG. 2 is a plot comparing the variation in cumulative hydrogen concentration with time for two electrodes, one containing LiH and another, control electrode, containing no hydride, while under an applied bias voltage which was alternated between 3 volts and 0 volts.

Some results obtained at about ambient temperature with the set-up and reactants of FIG. 1 are shown in FIG. 2 for two negative electrode compositions. One electrode composition containing LiH was fabricated by the process described above. In a separate test another electrode, omitting LiH from the composition, was processed similarly. The results from the LiH-containing electrode are shown by curve 40 and the results from the electrode without LiH are shown at curve 50. In both cases, the hydrogen concentration in the open volume of container 14, measured by hydrogen sensor 24 (FIG. 1), is shown as a function of time.

FIG. 2 also illustrates the effects of applying and not applying the 3 volt electric potential. The potential is applied, for the LiH-containing electrode over the time window from about 4500 to 6500 seconds encompassed by box 42; for the electrode which was prepared without LiH, the potential was applied over the time period extending from about 1500 seconds to about 5200 seconds and encompassed by (dashed) box 52.

In both cases, at early times, some modest evolution of hydrogen was indicated even in the absence of an applied potential. It is believed that this is attributable to a combination of instrumental drift over the long time-frame of the test and, in the case of the LiH-containing electrode, reflects some oxidation, possibly with some $H_2O$ as an impurity in the electrolyte. Importantly, in the case of the control, or dummy electrode, the rate of apparent evolution of hydrogen was unaffected by application of a potential. The portion of curve 50 encompassed by box 52 is the time during which a potential of 3 volts was applied: clearly the data is represented by one smooth and continuous curve independent of whether or not a potential is applied.

However, as shown by curve 40, representative of an electrode containing LiH, a dramatic increase in hydrogen evolution occurred when a potential of 3 volts was applied, that is in the portion of the curve encompassed by box 42. If the applied voltage had no effect, the hydrogen generation would have continued to follow a simple extrapolation of the early portion of the curve as shown by curve 40'. On the basis of such extrapolation, after test termination or about 8700 seconds or so, a hydrogen concentration of about 0.13% or so would have been recorded, whereas a much larger hydrogen concentration of about 0.41% or so was actually recorded. When the potential was increased, corresponding to edge 44 of box 42, the rate of change of hydrogen concentration with time began to increase and shortly reached a limiting value more than 10 times greater than the initial rate. When the electrical potential was removed, corresponding to edge 46 of box 42, the observed rate of hydrogen evolution asymptotically declined to about its initial rate.

These tests confirm that provided a hydrogen-containing compound is present at an electrode that it may be reacted electrochemically to give up hydrogen. Since the reactions are reversible, applying an opposing potential with the cell under a hydrogen atmosphere may enable reversible storage and release of hydrogen at temperatures far lower than are required for thermally driven reactions. It will be appreciated that reversal of some reactions may occur more readily or more completely than others, depending for example on the number, scale and distribution of reactants.

As noted, other compounds and reactions may also be promoted electrochemically. Further details of these previously-identified reactions 2.-14. are provided below. Each overall reaction is followed, in parentheses, by its gravimetric efficiency for hydrogen storage (in %) and the equilibrium electrochemical potential (in volts, V)

$LiBH_4 \rightarrow B+Li+2H_2$ (18.5%) (E=0.33 V)   2.

In this reaction, the metal cation-based hydrogen storage compound containing hydrogen in hydridic form in the negative electrode is LiBH$_4$, the metal cation is Li$^+$, and hydrogen is released from the negative electrode.
The half cell reactions are:

LiBH$_4$→Li$^+$+B+2H$_2$+2e$^-$ at the negative electrode, and

Li$^+$+2e$^-$→Li at the positive electrode.

2LiBH$_4$+3Al→AlB$_2$+2LiAl+4H$_2$ (6.5%) (E=0.01 V)  3.

In this reaction, the metal cation-based hydrogen storage compound containing hydrogen in hydridic form in the negative electrode is LiBH$_4$, the metal cation is Li$^+$, and hydrogen is released from the negative electrode. Aluminum is included in both the negative and positive electrodes to destabilize the LiBH$_4$ by stabilizing the dehydrogenation products B (in the negative electrode as AlB$_2$) and Li (in the positive electrode as LiAl).
The half-cell reactions are:

2LiBH$_4$+Al→2Li$^+$+AlB$_2$+4H$_2$+2e$^-$ at the negative electrode, and

2Li$^+$+2Al+2e$^-$→2LiAl at the positive electrode.

2LiBH$_4$+MgH$_2$→MgB$_2$+2Li+5H$_2$ (14.4%) (E=0.21 V)  4.

In this reaction, the metal cation-based hydrogen storage compound containing hydrogen in hydridic form in the negative electrode is LiBH$_4$, the metal cation is Li$^+$, and hydrogen is released from the negative electrode. The LiBH$_4$ is destabilized by the inclusion of MgH$_2$ in the negative electrode.
The half-cell reactions are:

2LiBH$_4$+MgH$_2$→2Li$^+$+MgB$_2$+5H$_2$+2e$^-$ at the negative electrode, and

2Li$^+$+2e$^-$→2Li at the positive electrode.

2LiBH$_4$+MgH$_2$+2Al→MgB$_2$+2LiAl+5H$_2$ (8.1%) (E=0.11 V)  5.

In this reaction, the metal cation-based hydrogen storage compound containing hydrogen in hydridic form in the negative electrode is LiBH$_4$, the metal cation is Li$^+$, and hydrogen is released from the negative electrode. The LiBH$_4$ is destabilized by the inclusion of MgH$_2$ in the negative electrode and Al in the positive electrode.
Here the half-cell reactions are:

2LiBH$_4$+MgH$_2$→2Li$^+$+MgB$_2$+5H$_2$+2e$^-$ at the negative electrode, and

2Li$^+$+2Al+2e$^-$→2LiAl at the positive electrode

2Li+2LiOH→2Li$_2$O+H$_2$ (3.2%) (E=−1.23 V)  7.

In this reaction, the metal cation-based hydrogen storage compound containing hydrogen in protonic form in the positive electrode is LiOH, the metal cation is Li$^+$, and hydrogen is released from the positive electrode. In this case—note the change in sign of the applied electrical potential—the reaction is exothermic, and thus, ideally, no applied potential would be necessary to release the hydrogen. However, in practice some applied potential could still be necessary to overcome the overpotential and achieve desired rates.

The half-cell reactions are:

2Li→2Li$^+$+2e$^-$ at the negative electrode, and

2Li$^+$+2LiOH+2e$^-$→2Li$_2$O+H$_2$ at the positive electrode.

2LiH+2LiOH→2Li$_2$O+2H$_2$ (6.2%) (E=−0.26 V)  8.

In this reaction, the metal cation-based hydrogen storage compound is LiH in the negative electrode and LiOH in the positive electrode, the metal cation is Li$^+$, and hydrogen is released from both electrodes.
Here the half-cell reactions are:

2LiH→2Li$^+$+H$_2$+2e$^-$ at the negative electrode, and

2Li$^+$+2LiOH+2e$^-$→2Li$_2$O+H$_2$ at the positive electrode

4Li+2LiNH$_2$→2Li+2Li$_2$NH+H$_2$ (2.7%)→3Li$_3$N+2H$_2$ (5.4%)  9.

In this reaction, the metal cation-based hydrogen storage compound containing hydrogen in protonic form in the positive electrode is LiNH$_2$, the metal cation is Li$^+$, and hydrogen is released from the positive electrode in two reaction steps.

2LiH+LiNH$_2$→LiH+Li$_2$NH+H$_2$ (4.3%)→Li$_3$N+2H$_2$ (8.6%)  10.

In this reaction, the metal cation-based hydrogen storage compound is LiH in the negative electrode and LiNH$_2$ in the positive electrode, the metal cation is Li$^+$, and hydrogen is released from both electrodes in two steps.

2LiBH$_4$+LiNH$_2$→2B+Li$_3$N+5H$_2$ (14.9%)  11.

In this reaction, the metal cation-based hydrogen storage compound is LiBH$_4$ in the negative electrode and LiNH$_2$ in the positive electrode, the metal cation is Li$^+$, and hydrogen is released from both electrodes.

2LiBH$_4$+MgH$_2$+LiNH$_2$→MgB$_2$+Li$_3$N+6H$_2$ (12.9%)  12.

In this reaction, the metal cation-based hydrogen storage compound is LiBH$_4$ in the negative electrode and LiNH$_2$ in the positive electrode, the metal cation is Li$^+$, and hydrogen is released from both electrodes. The LiBH$_4$ in the negative electrode is destabilized by inclusion of MgH$_2$.

2LiH+Mg(NH$_2$)$_2$→Li$_2$Mg(NH)$_2$+2H$_2$ (10.5%)  13.

In this reaction, the metal cation-based hydrogen storage compound is LiH in the negative electrode and Mg(NH$_2$)$_2$ in the positive electrode, the metal cation is Li$^+$, and hydrogen is released from both electrodes.

MgH$_2$→Mg+H$_2$ (7.6%) (E=0.19 V)  14.

In this reaction, the metal cation-based hydrogen storage compound is MgH$_2$ in the negative electrode, the metal cation is Mg$^{2+}$, and hydrogen is released from the negative electrode.

The above listing of reactions is exemplary and not limiting. Alternative suitable hydrides include low atomic weight, light metal simple hydrides, for example LiH or MgH$_2$ or complex hydrides such as alanates (AlH$^{4-}$), amides (NH$^{2-}$) or borohydrides (BH$^{4-}$). Such complex hydrides may include light metal cations such as Li$^+$, Mg$^+$, Na$^+$, K$^+$ and Ca$^{++}$.

It will be appreciated that the cell configuration shown in FIG. 1 is illustrative of the elements of a cell but that alternative configurations and arrangements of the cell elements may be employed.

For example, for cell efficiency it is preferred that the electrodes be closely spaced, say 20-30 micrometers apart with a porous, electrically non-conducting separator between them. Such a separator may allow passage of ions from one electrode to another and permitting migration of hydrogen from the electrodes while preventing electrode to electrode contact and short-circuiting. The output of a cell will scale with the mass of hydride and hence with the electrode area. So, for a high output cell, the electrodes should be extensive.

It is preferred to utilize the entire area of the electrode, but the electrical potential difference which must be applied to promote reaction depends on the pressure of the hydrogen generated. Thus hydrogen, if rapidly generated on an electrode at a location where the hydrogen lacks easy passage to the electrode edge where it may be collected and/or removed, may steadily increase in pressure, reducing the rate of reaction. In an extreme case where the hydrogen is largely trapped, the increased pressure may substantially choke off the reaction entirely.

It is apparent that if the sole means for removing hydrogen is at the edges of the electrodes that much of the electrode area will be ill-used unless the electrodes are small, say from about 100 square millimeter or about 10 millimeters by 10 millimeters or so to about 1000 square millimeters. If electrodes of larger area are to be used, they may be adapted or packaged to lessen the distance over which hydrogen must be transported. Typically this will result in more compact electrode configuration, for example spiral wound cells or Z-fold or W-fold geometries with interleaved electrodes of the opposite sign and of limited extent. For these configurations it may be preferred to form the electrode as a thin deposit on a foil, optionally perforated for enhanced mechanical interference between the electrode material and the support for enhanced electrode retention.

Figure 3:
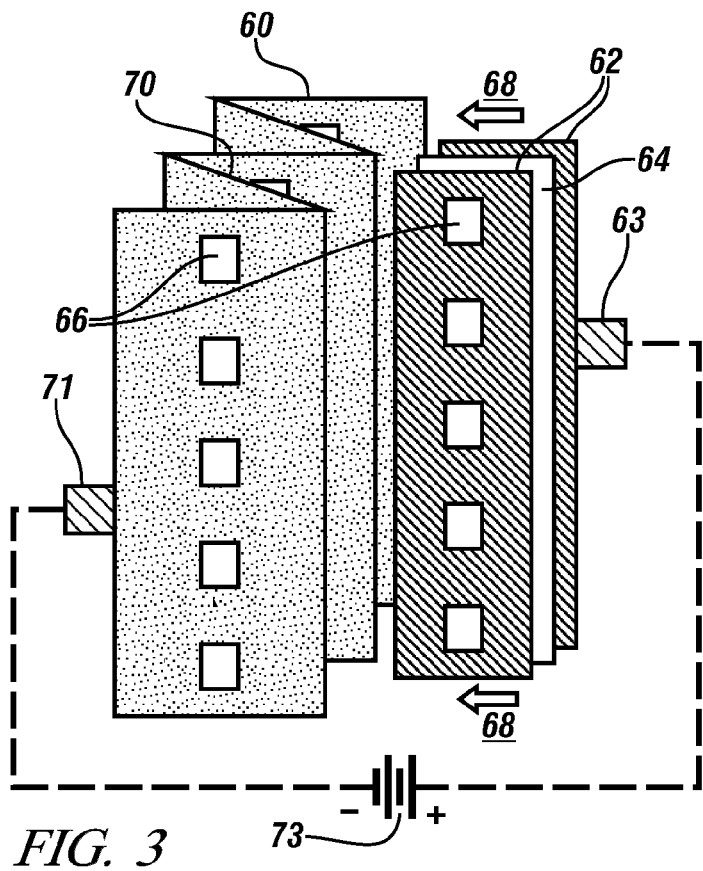
FIG. 3 is illustrative of an electrode configuration of a hydrogen storage and release cell electrode adapted for passage of hydrogen from a cell interior to a cell exterior.

It may also be appropriate to make provision to more readily transport the hydrogen generated at the center of the electrode away from the electrode. A possible configuration is shown at FIG. 3 in which a cell is to be assembled by inserting a grouping of electrodes 64 with a porous spacer 62 on either side into the folds 70 of a folded second electrode 60 by advancing in the direction of arrows 68. For clarity only one such grouping is shown. Each of electrodes 60 and 64 as well as spacers 62 has substantially equally-sized openings 66, which, when the electrodes and spacer are assembled together align to form a continuous channel for hydrogen collection through the folded cell. Connection means for attachment of the electrodes to an external power source 73 are illustrated as tabs 63 and 71.

Figure 4:
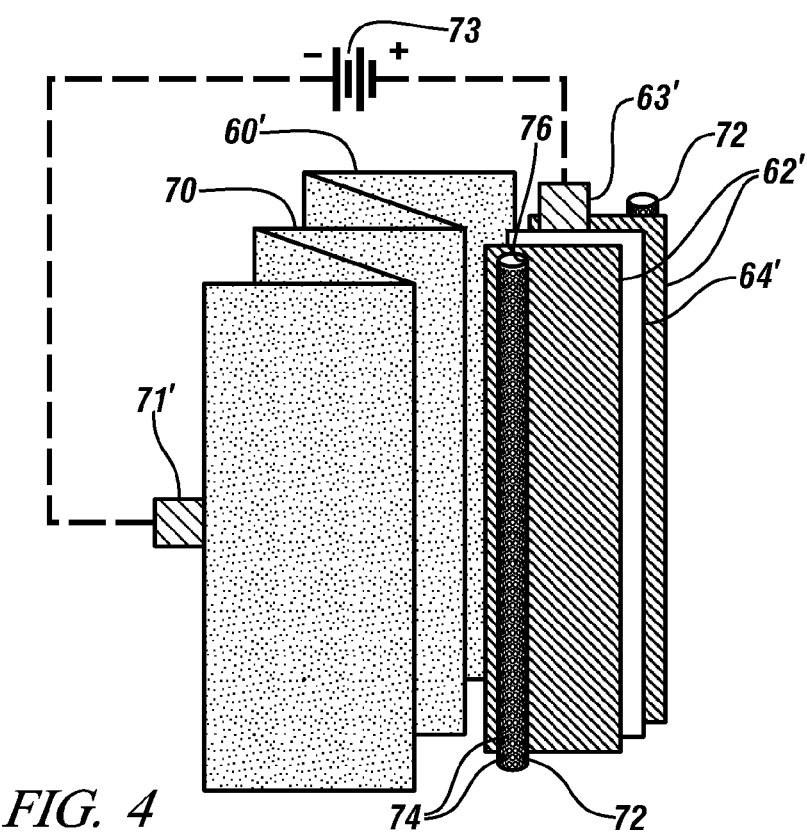
FIG. 4 is illustrative of a configuration of a hydrogen storage and release cell adapted for passage of hydrogen from a cell interior to a cell exterior.

Another embodiment, a representative example of which is shown in FIG. 4, uses similar interleaved electrode elements 60' and 64' and spacers 62' inserted into folds 70. But in this embodiment a continuous channel 72 for hydrogen collection is interposed between the electrodes. Channel 72 is a tube, here shown as being of circular cross-section, for lateral transport of hydrogen and has openings 74 in the wall 76 to permit ingress of hydrogen from the positive or negative electrode of the cell. Offsetting the channels 72 as shown, enables a more compact configuration and the configuration may be rendered yet more compact by using an oval tube oriented with its long axis generally parallel to the active faces of the electrodes. As in the previous embodiment, connection means for attachment of the electrodes to an external power source 73 are shown, here tabs 63' and 71'.

The merits of the cell configurations shown in FIGS. 3 and 4 have been described in the context of hydrogen release. But either of the embodiments shown will offer similar benefits in supplying hydrogen to the cell interior to make the best use of the total available electrode area if the cell is being regenerated.

It may be preferred to operate the cell under modest pressure, relative to atmospheric pressure. Suitably the hydrogen pressure should be at least about 5 bar or so for compatibility with fuel cell systems which are commonly operated at elevated pressure, but, for control purposes, as discussed further below, it may be advantageous to operate the cell at pressures of up to 20 bar or so.

In all of the hydrogen release reactions 1.-14., increase in the hydrogen pressure will, by LeChatelier's principle, favor the reactants rather than the reaction products and so limit hydrogen evolution. But this may be overcome by increasing the cell potential. Under stable conditions, the pressure of the evolved hydrogen gas may be controlled by controlling the applied electrical potential. This may be used to control the pressure so that the process may be run essentially open loop relying on only the applied potential to ensure that hydrogen is evolved at a suitable pressure.

In practice, kinetic and environmental considerations, like the level of exhaustion of the cell and the cell temperature, may result in a more variable hydrogen pressure under constant electrical potential and require a more sophisticated control algorithm. This could entail installing a hydrogen pressure sensor and, optionally, a (hydrogen) flow sensor, in the cell and using the hydrogen pressure and hydrogen demand, estimated from the hydrogen flow rate, to control the applied cell potential using either on-off or proportional control A simpler approach is to operate the cell open loop but at a potential which, over the expected range of any variables, will guarantee at least a minimum hydrogen pressure, for example, the 5 bar or so appropriate for fuel cells or other intended use. When conditions exceed the minimum, hydrogen will be generated at a higher pressure, but a pressure regulator, installed in the hydrogen line between the cell and any hydrogen-consuming device, may be used to ensure that the hydrogen-consuming device is isolated from any higher hydrogen gas pressure. It may be preferred to install a small storage tank between the cell and the regulator to buffer any surges in output or short-lived periods of high demand.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of reversibly storing hydrogen electrochemically, the method comprising applying a suitable electrical potential difference between first and second spaced apart electrodes in facing relation with at least one of the electrodes comprising one or more hydrogen-storing composition precursors selected from the group consisting of a hydride-forming composition, a borohydride-forming composition, an alanate-forming composition, an amide-forming composition, an imide-forming composition, and a hydroxide-forming composition, each of the first and second electrodes being in contact with a non-aqueous electrolyte suited for ionic conduction, the electrodes and electrolyte being maintained under a hydrogen atmosphere, the applied potential difference promoting reaction of the hydrogen with the hydrogen-storing composition precursor to thereby form, in or on, the at least one electrode, a hydrogen-storing composition consisting of at least one of the group consisting of a hydride, a borohydride, an alanate, an amide, an imide and a hydroxide, and, continuing to store hydrogen as the just-formed hydrogen-storing composition until hydrogen is needed, then, reversing the electrical potential difference between the first and second spaced apart electrodes to release a needed quantity of hydrogen at and from the at least one electrode and to at least partially restore a corresponding portion of the initial hydrogen-storing composition precursor of the at least one electrode to prepare the at least one electrode to again store hydrogen.

2. The method of reversibly storing hydrogen recited in claim 1 in which at least one electrode comprises one or more of Ni, Cu, Al, Mg, Ni, Ti, Fe, Zr, Mn, La, Sn, graphite and carbon.

3. The method of reversibly storing hydrogen recited in claim 1 in which at least one electrode comprises one or more of carbon-supported platinum, palladium, and nickel.

4. The method of reversibly storing hydrogen recited in claim 1 in which the hydride-forming composition, borohydride-forming composition, alanate-forming composition, amide-forming composition, imide-forming composition, or hydroxide-forming composition comprises one or more of Li, Mg, Na, K, and Ca.

5. A method of reversibly storing hydrogen, the method comprising:

applying a potential difference between first and second spaced-apart electrodes, immersed in a non-aqueous electrolyte, and in facing relation in an electrochemical cell, in which the first electrode comprises one or more of the metal elements Li, Mg, Na, K and Ca and the second electrode comprises a composition capable of storing a hydrogen-containing composition formed by reaction with hydrogen and cations of the one or more of the metal elements in the presence of the non-aqueous electrolyte, and concurrently contacting the second electrode with hydrogen gas, the applied electrical potential causing the electrochemical transport of metal cations of the one or more metal elements from the first electrode through the non-aqueous electrolyte to the second electrode where the metal cations react, under the applied potential, with hydrogen gas to store hydrogen as a hydrogen-containing composition comprising the one or more metals and hydrogen in the second electrode, the thus-formed hydrogen-containing composition being capable of releasing hydrogen gas, and cations of the one or more metals, when an electrical potential of opposite polarity is applied between the first and second electrodes.

6. A method of reversibly storing hydrogen as recited in claim 5, in which the second electrode further comprises particles of one or more of Ni, Cu, Al, Mg, Ni, Ti, Fe, Zr, Mn, La, Sn, graphite, and carbon in an amount to provide electrical conductivity between and to the hydrogen-containing composition of the electrode.

7. A method of reversibly storing hydrogen as recited in claim 5, in which at least one electrode further comprises particles containing one or more of platinum and palladium as a catalyst for the reaction of hydrogen with the metal cations and the hydrogen-containing composition.

8. A method of reversibly storing hydrogen as recited in claim 5 in which the non-aqueous electrolyte comprises 1 molar $LiPF_6$ dissolved in a 1:1 mixture of ethylene carbonate and dimethyl carbonate and lithium ions are transported from the first electrode through the non-aqueous electrolyte to the second electrode to react with hydrogen gas and to form a lithium-containing hydride for the reversible storage of hydrogen.

9. A method of reversibly storing hydrogen as recited in claim 5 in which the hydrogen-containing composition is one or more of a hydride, a borohydride, an alanate, an amide, an imide, or a hydroxide.

10. A method of reversibly storing hydrogen, the method comprising:

applying a potential difference between first and second spaced-apart electrodes, immersed in a non-aqueous electrolyte, and in facing relation in an electrochemical cell in which the first electrode comprises lithium and the second electrode comprises a composition capable of forming and/or storing a hydrogen-containing composition upon reaction of hydrogen and lithium cations in the presence of the non-aqueous electrolyte, and concurrently contacting the second electrode with hydrogen gas, the applied electrical potential causing the electrochemical transport of lithium cations from the first electrode through the non-aqueous electrolyte to the second electrode where the lithium cations react, under the applied potential, with hydrogen gas to store hydrogen as a hydrogen-containing composition comprising lithium and hydrogen in the second electrode, the thus-formed hydrogen-containing composition being capable of releasing hydrogen gas, and lithium cations, when an electrical potential of opposite polarity is applied between the first and second electrodes.

11. A method of reversibly storing hydrogen as recited in claim 10, in which the second electrode further comprises particles of one or more of Ni, Cu, Al, Mg, Ni, Ti, Fe, Zr, Mn, La, Sn, graphite, and carbon in an amount to provide electrical conductivity between and to hydrogen-containing composition of the electrode.

12. A method of reversibly storing hydrogen as recited in claim 10, in which at least one electrode further comprises particles containing one or more of platinum and palladium as a catalyst for the reaction of hydrogen with the lithium cations and the hydrogen-containing composition.

13. A method of reversibly storing hydrogen as recited in claim 10 in which the hydrogen-containing composition is one or more of a hydride, a borohydride, an alanate, an amide, an imide, or a hydroxide.

14. A method of reversibly storing hydrogen as recited in claim 13 in which the non-aqueous electrolyte is one of 1 molar $LiPF_6$ dissolved in a 1:1 mixture of ethylene carbonate and dimethyl carbonate, and 1 molar $LiClO_4$ dissolved in dimethyl carbonate.

* * * * *